(12) United States Patent
Mordasini et al.

(10) Patent No.: US 10,272,302 B2
(45) Date of Patent: Apr. 30, 2019

(54) FIBER-REINFORCED COMPOSITE TUBULAR SHAFTS AND MANUFACTURE THEREOF

(71) Applicant: North Thin Ply Technology Sarl, Penthalaz-Cossonay (CH)

(72) Inventors: Francois Mordasini, Penthalaz-Cossonay (CH); Gerard Gautier, Penthalaz-Cossonay (CH); Wayne Smith, Penthalaz-Cossonay (CH)

(73) Assignee: North Thin Ply Technology Sarl, Penthalaz-Cossonay (CH)

( * ) Notice: Subject to any disclaimer, the term of this patent is extended or adjusted under 35 U.S.C. 154(b) by 0 days.

(21) Appl. No.: 15/073,907

(22) Filed: Mar. 18, 2016

(65) Prior Publication Data

US 2016/0271465 A1    Sep. 22, 2016

(30) Foreign Application Priority Data

Mar. 20, 2015    (EP) .................................... 15160141

(51) Int. Cl.
*A63B 53/10*    (2015.01)
*B29C 53/60*    (2006.01)
(Continued)

(52) U.S. Cl.
CPC .............. *A63B 53/10* (2013.01); *B29C 53/60* (2013.01); *B29C 70/326* (2013.01); *B29C 53/845* (2013.01)

(58) Field of Classification Search
CPC ....... A63B 53/10; B29C 53/60; B29C 53/845; B29C 70/326
See application file for complete search history.

(56) References Cited

U.S. PATENT DOCUMENTS 3,700,519 A    10/1972  Carter
3,810,803 A *  5/1974  Karp ........................ B31C 3/00
                                                    156/190

(Continued)

FOREIGN PATENT DOCUMENTS

GB    1446444 A  *  8/1976  ............. A63B 53/10
WO    9958208 A1    11/1999
WO    2008076992 A2    6/2008

OTHER PUBLICATIONS

Int'l. Search Report and Written Opinion dated Jun. 17, 2016 in corresponding Int'l. Application No. PCT/EP2016/056053.

(Continued)

*Primary Examiner* — Stephen Blau
(74) *Attorney, Agent, or Firm* — Polsinelli, PC

(57) ABSTRACT

A sports article comprising an elongate tubular shaft comprised of a fiber-reinforced resin matrix composite material, wherein the elongate tubular shaft has a longitudinal direction and the shaft is multilaminar and includes at least two fibrous layers, each of which is helically wrapped about a wrapping direction extending along the longitudinal direction to form the elongate tubular shaft, wherein each fibrous layer comprises a plurality of oriented structural fibers which are substantially aligned along the longitudinal direction so as to be oriented within +/−10° of the longitudinal direction, the oriented structural fibers having a length, along the longitudinal direction, of less than the length of the elongate tubular shaft to form discontinuous structural fibers serially oriented along the elongate tubular shaft. Also disclosed is a method to produce such a multilaminar elongate tubular shaft.

9 Claims, 12 Drawing Sheets

(51) Int. Cl.
*B29C 70/32* (2006.01)
*B29C 53/84* (2006.01)

(56) References Cited

U.S. PATENT DOCUMENTS

| | | | | |
|---|---|---|---|---|
| 4,000,896 A * | 1/1977 | Lauraitis | ................ | A63B 53/10 |
| | | | | 273/DIG. 23 |
| 4,010,054 A | 3/1977 | Bradt | | |
| 4,082,277 A * | 4/1978 | Van Auken | ............ | A63B 53/10 |
| | | | | 156/185 |
| 4,125,423 A * | 11/1978 | Goldsworthy | ........ | B29C 31/002 |
| | | | | 156/175 |
| 4,135,035 A | 1/1979 | Branen et al. | | |
| 4,309,473 A * | 1/1982 | Minamisawa | ............. | C08J 5/24 |
| | | | | 156/189 |
| 4,725,060 A | 2/1988 | Iwanaga | | |
| 5,101,556 A | 4/1992 | Fluga et al. | | |
| 5,231,783 A * | 8/1993 | Utsuno | ................. | A01K 87/00 |
| | | | | 156/184 |
| 5,256,230 A | 10/1993 | Winkel | | |
| 5,419,554 A * | 5/1995 | Krone | .................... | A63B 49/10 |
| | | | | 473/535 |
| 5,427,373 A * | 6/1995 | Kusumoto | ............. | A63B 53/10 |
| | | | | 273/DIG. 23 |
| 6,106,413 A * | 8/2000 | Kusumoto | ............. | A63B 53/10 |
| | | | | 473/319 |
| 8,328,666 B2 * | 12/2012 | Hsu | ......................... | B29C 44/16 |
| | | | | 473/535 |
| 9,199,429 B2 * | 12/2015 | Tsai | ......................... | B32B 3/16 |
| 2011/0087070 A1* | 4/2011 | Tilson | ................ | A61B 1/00135 |
| | | | | 600/121 |
| 2015/0030805 A1* | 1/2015 | Tsai | ......................... | B32B 5/12 |
| | | | | 428/110 |
| 2018/0311913 A1* | 11/2018 | McCarville | ............. | B29C 70/30 |

OTHER PUBLICATIONS

Int'l. Preliminary Report on Patentability dated Sep. 26, 2017 in priority application PCT/EP2016/056053.
Int'l. Search Report and Written Opinion dated Jun. 15, 2016 in priority application PCT/EP2016/056063.
Extended Search Report dated Aug. 20, 2015 in priority application EP 15160141.6.

* cited by examiner

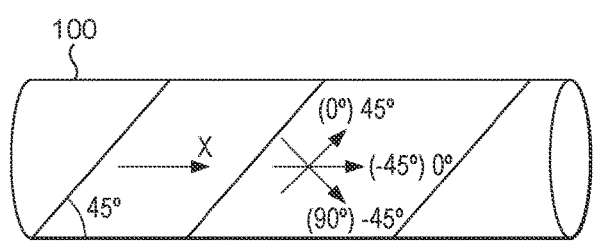
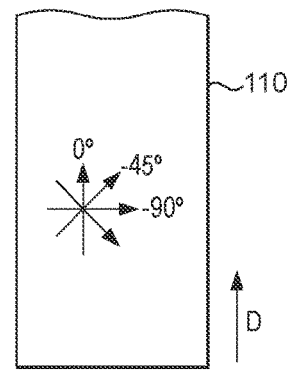
FIG. 6a  FIG. 6b
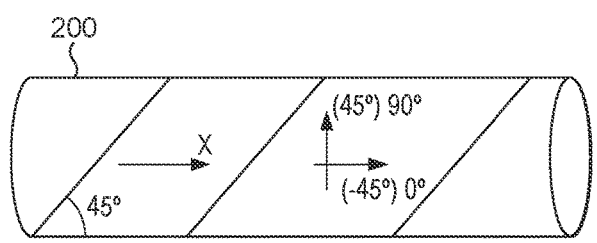
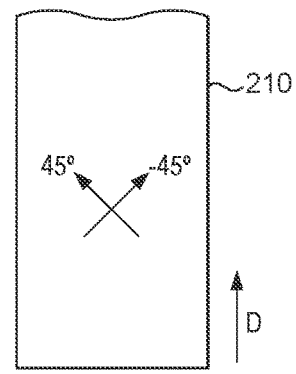
FIG. 7a  FIG. 7b

FIBER-REINFORCED COMPOSITE TUBULAR SHAFTS AND MANUFACTURE THEREOF

FIELD OF THE INVENTION

The present invention relates to a sports article comprising an elongate tubular shaft comprised of a fiber-reinforced resin matrix composite material. The present invention also relates to a method for manufacturing such an elongate tubular shaft comprised of a fiber-reinforced resin matrix composite material.

BACKGROUND OF THE INVENTION

Generally, a composite tube is produced by a method in which prepreg material is wound in a superposed manner around a metallic mandrel, then pressure is applied with a compacting system on this composite structure, then the thermoset and/or thermoplastic resin matrix is consolidated, and then the mandrel is removed from the product. Prepreg material is widely used in the manufacture of composite parts and structures. Prepreg material is a combination of thermoset and/or thermoplastic resin matrix and fiber reinforcement. The fibers of prepreg material are continuous fibers that extend parallel to each other. Preform is created by stacking individual layers of unidirectional tape optionally with different types of fiber, different resin matrix and/or different ply weight so that the layers of the preform contain fibers extending in different directions.

To improve the performance of the composite tube when submitted to loading specific to its use, the major portion of the reinforcing fibers of the preform should be oriented in order to improve the performance of the tube. However, existing manufacturing methods do not permit to achieve such a result at a high level of quality and without badly impacting on the homogeneity of the tube. In particular, such composite tubes are generally made by a roll wrapping process. Roll wrapping consists of wrapping preforms or individual layers of prepreg material having the same length as the tube and a width corresponding to a certain number of revolutions around the mandrel. Thus, the beginning and end of each wrapped preform or layer results in a defect in the tube. Furthermore, this roll wrapping process may require several steps to achieve the total required thickness and the quality of the tube depends on the skill and experience of the operator.

It is known to manufacture sports articles such as golf club shafts, fishing rods, rackets, etc. from a fiber-reinforced resin matrix composite material, in particular a carbon fiber composite material. However, elongate tubular shafts of carbon fiber composite material tend to suffer from the problem of exhibiting non-uniform properties, in particular a non-uniform wall thickness which leads to undesired variations in flexural stiffness along the shaft and when the flexural force is applied in different rotational orientations around the axis of the shaft.

The aim of the present invention is therefore to at least partially to overcome this problem with known shafts and to provide an improved sports article comprising an elongate tubular shaft comprised of a fiber-reinforced resin matrix composite material and manufacturing method, in particular in which the elongate tubular shaft can exhibit constant flexural properties by providing tubular shaft which has a highly concentric wall structure, with a uniformly controlled wall thickness around the axis of the shaft and accurate control of fiber alignment around the axis of the shaft.

SUMMARY OF THE INVENTION

The present invention provides a sports article comprising an elongate tubular shaft comprised of a fiber-reinforced resin matrix composite material, wherein the elongate tubular shaft has a longitudinal direction and the shaft is multi-laminar and includes at least two fibrous layers, each of which fibrous layers is helically wrapped about a wrapping direction extending along the longitudinal direction to form the elongate tubular shaft, wherein each fibrous layer comprises a plurality of oriented structural fibers which are substantially aligned along the longitudinal direction so as to be oriented within +/−10° of the longitudinal direction, the oriented structural fibers having a length, along the longitudinal direction, of less than the length of the elongate tubular shaft to form discontinuous structural fibers serially oriented along the elongate tubular shaft.

In preferred embodiments of the present invention, each fibrous layer is helically wrapped about the wrapping direction so that the structural fibers of each helical wrap at least partially overlap with the structural fibers of a longitudinally adjacent helical wrap. Preferably, the structural fibers of each wrap at least partially overlap with from 5 to 90% of the length of the structural fibers of the longitudinally adjacent helical wrap.

In preferred embodiments of the present invention, a degree of overlap between the structural fibers of each wrap varies along the length of the shaft, Preferably, the degree of overlap between the structural fibers of each wrap increases substantially continuously, more preferably increases substantially linearly, along the length of the shaft.

In preferred embodiments of the present invention, the helical wrap has a width, orthogonal to a helical direction, of from 10 to 140 mm. The width is typically from 15 to 50 mm, further typically from 25 to 35 mm, still further typically about 30 mm.

In preferred embodiments of the present invention, the width of the helical wrap, orthogonal to the helical direction, varies along the length of the shaft. Preferably, the width of the helical wrap, orthogonal to the helical direction, increases substantially continuously, more preferably increases substantially linearly, along the length of the shaft.

In preferred embodiments of the present invention, the elongate tubular shaft has an external elongate substantially conical surface and an internal elongate substantially conical surface. Preferably, each substantially conical surface comprises a series of adjoining conics.

In preferred embodiments of the present invention, the external elongate substantially conical surface and the internal elongate substantially conical surface are inclined at different respective inclination angles relative to the longitudinal direction. Preferably, the inclination angle of the external elongate substantially conical surface is smaller than the inclination angle of the internal elongate substantially conical surface, each inclination angle being relative to the longitudinal direction, whereby the wall thickness of the elongate tubular shaft decreases in combination with an increase in a diameter of the external elongate conical surface along a length of the elongate tubular shaft.

In preferred embodiments of the present invention, the wall thickness of the elongate tubular shaft decreases substantially continuously with the increase in diameter of the external elongate conical surface along the length of the elongate tubular shaft. Preferably, the wall thickness of the elongate tubular shaft decreases substantially linearly with the increase in diameter of the external elongate conical surface along the length of the elongate tubular shaft.

In preferred embodiments of the present invention, the elongate tubular shaft has a longitudinal flexural stiffness which is substantially uniform when measured in a measuring direction orthogonal to the longitudinal direction at any angle of rotation relative to an axis coincident with the longitudinal direction. Preferably, the longitudinal flexural stiffness varies by less than +/−0.5% when measured in a measuring direction orthogonal to the longitudinal direction at any angle of rotation relative to an axis coincident with the longitudinal direction.

In preferred embodiments of the present invention, the helical wrapping is along a helical direction which is at an angle of from 5 to 45 degrees, preferably from 10 to 35 degrees, further preferably from 15 to 25 degrees, yet further preferably at about 20 degrees, to a plane perpendicular to the longitudinal direction. Preferably, the angle of the helical direction is constant along the length of the tubular shaft.

In preferred embodiments of the present invention, at least two of the fibrous layers are helically wrapped about opposite rotational helical directions, preferably at equal and opposite helical wrapping angles.

In preferred embodiments of the present invention, alternating fibrous layers are helically wrapped about opposite rotational helical directions, preferably at equal and opposite helical wrapping angles.

In preferred embodiments of the present invention, the structural fibers are discontinuously aligned along the longitudinal direction along substantially the entire length of the elongate tubular shaft.

In preferred embodiments of the present invention, all of the fibers in the elongate tubular shaft which are aligned along the longitudinal direction are discontinuous fibers which each respectively extend along only a portion of the elongate tubular shaft.

In preferred embodiments of the present invention, the structural fibers which are aligned along the longitudinal direction have a length, along the longitudinal direction, of from 20 to 100 mm.

In preferred embodiments of the present invention, all of the structural fibers in the elongate tubular shaft are discontinuous fibers which each respectively extend along only a portion of the elongate tubular shaft.

In preferred embodiments of the present invention, at least two of the fibrous layers, preferably all of the fibrous layers, each respectively further comprise a plurality of helical structural fibers which are helically wound around the longitudinal direction, the helical structural fibers having a length in the longitudinal direction of less than the length of the elongate tubular shaft to form discontinuous helical structural fibers serially oriented along the elongate tubular shaft.

In preferred embodiments of the present invention, at least two of the fibrous layers, preferably all of the fibrous layers, each respectively comprise first and second adjacent plies, the first ply comprising the substantially longitudinally oriented structural fibers of the respective fibrous layer and the second ply comprising the helical structural fibers of the respective fibrous layer. Preferably, at least two of the fibrous layers, more preferably all of the fibrous layers, each respectively comprise a helically wrapped tape comprising the first and second adjacent plies.

In preferred embodiments of the present invention, the helical structural fibers are helically wound around the longitudinal direction at an angle of +/−45 degrees to the longitudinal direction.

In preferred embodiments of the present invention, the shaft comprises from 40 to 80 wt % of the substantially longitudinally oriented structural fibers and from 20 to 60 wt % of the helical structural fibers, each wt % being based on the total weight of the structural fibers. Preferably, the helical structural fibers are helically wound around the longitudinal direction at an angle of +/−45 degrees to the longitudinal direction.

In preferred embodiments of the present invention, the elongate tubular shaft has a length of from 300 to 1500 mm.

In preferred embodiments of the present invention, each fibrous layer is helically wrapped with from 5 to 50 rotations about the wrapping direction to form the elongate tubular shaft.

In preferred embodiments of the present invention, the oriented structural fibers are substantially aligned along the longitudinal direction so as to be oriented within +/−5°, preferably +/−2°, of the longitudinal direction.

In preferred embodiments of the present invention, the structural fibers comprise or consist of carbon fibers. The structural fibers are in a resin matrix to form the fiber-reinforced resin matrix composite material. Preferably the resin matrix is composed of a thermoset resin, for example an epoxy resin, although other thermosetting or thermoplastic resins well known to those skilled in the composite material art may alternatively be employed.

In preferred embodiments of the present invention, the elongate tubular shaft is a golf club shaft. Preferably, the shaft is substantially conical and extends between a handle end and a head end, a diameter of the shaft being greater at the handle end than at the head end.

In preferred embodiments of the present invention, the shaft is substantially conical and extends between a handle end and a head end, a wall thickness of the shaft being greater at the handle end than at the head end.

In preferred embodiments of the present invention, the sports article has a weight of from 45 to 65 g, a flexibility defined by a frequency of from 230 to 300 cycles per minute when the shaft is flexed and then released in a flexing direction orthogonal to the longitudinal direction at any angle of rotation about an angle of 360 degrees relative to an axis coincident with the longitudinal direction. Preferably, the flexibility varies by no more than 5 cycles per minute at any angle of rotation about the angle of 360 degrees relative to the axis coincident with the longitudinal direction.

In preferred embodiments of the present invention, the shaft has a torque of from 2 to 5 degrees, the torque being measured by applying 1 foot pound of torque to the shaft at a first end of the shaft while clamping a second end of the shaft.

The present invention also provides a golf club comprising an elongate tubular shaft comprised of a carbon fiber-reinforced resin matrix composite material, wherein the elongate tubular shaft is substantially conical and has an external elongate substantially conical surface and an internal elongate substantially conical surface, the shaft extending between a handle end and a head end, a diameter of the shaft being greater at the handle end than at the head end, wherein the elongate tubular shaft has a longitudinal direction and the shaft is multilaminar and includes at least two fibrous layers comprising carbon fibres, each of which fibrous layers is helically wrapped about a wrapping direction extending along the longitudinal direction to form the elongate tubular shaft in which the carbon fibers of each helical wrap at least partially overlap with from 5 to 90% of the length of the carbon fibers of a longitudinally adjacent helical wrap, each fibrous layer comprises a plurality of oriented carbon fibers which are substantially aligned along the longitudinal direction so as to be oriented within +/−10° of the longitudinal direction, the oriented carbon fibers having a length, along the longitudinal direction, of from 20 to 100 mm to form discontinuous carbon fibers serially oriented along the elongate tubular shaft, and wherein the shaft has a weight of from 45 to 65 g, a flexibility defined by a frequency of from 230 to 300 cycles per minute when the shaft is flexed and then released in a flexing direction orthogonal to the longitudinal direction at any angle of rotation about an angle of 360 degrees relative to an axis coincident with the longitudinal direction, and wherein the flexibility varies by no more than 5 cycles per minute at any angle of rotation about the angle of 360 degrees relative to the axis coincident with the longitudinal direction The present invention also provides a method of manufacturing an elongate tubular shaft comprised of a fiber-reinforced resin matrix composite material, the tubular shaft being suitable for manufacturing a sports article, the method comprising the steps of:

a) providing a first fibrous layer comprising a prepreg;
b) helically wrapping the first fibrous prepreg layer about a wrapping direction extending along a longitudinal direction to form an elongate tube, the first fibrous layer comprising a plurality of oriented structural fibers which are substantially aligned along the longitudinal direction so as to be oriented within +/−10° of the longitudinal direction, the oriented structural fibers having a length, along the longitudinal direction, of less than the length of the elongate tube to form discontinuous structural fibers serially oriented along the elongate tube;
c) providing a second fibrous layer comprising a prepreg;
d) helically wrapping the second fibrous layer over the first fibrous layer, the second fibrous layer being wrapped about the wrapping direction extending along a longitudinal direction to provide the elongate tube with a multilaminar elongate tubular wall, the second fibrous layer comprising a plurality of oriented structural fibers which are substantially aligned along the longitudinal direction so as to be oriented within +/−10° of the longitudinal direction, the oriented structural fibers having a length, along the longitudinal direction, of less than the length of the elongate tube to form discontinuous structural fibers serially oriented along the elongate tube; and
e) heating and/or pressurising the elongate tube to form an elongate tubular shaft comprised of a fiber-reinforced resin matrix composite material.

In preferred embodiments of the present invention, in steps b) and d) each fibrous layer is respectively helically wrapped about the wrapping direction so that in each fibrous layer the structural fibers of each helical wrap at least partially overlap with the structural fibers of a longitudinally adjacent helical wrap. Preferably, in steps b) and d) each fibrous layer is respectively helically wrapped about the wrapping direction so that in each fibrous layer the structural fibers of each wrap at least partially overlap with from 5 to 90% of the length of the structural fibers of the longitudinally adjacent helical wrap.

In preferred embodiments of the present invention, in steps b) and d) each fibrous layer is respectively helically wrapped about the wrapping direction so that in each fibrous layer a degree of overlap between the structural fibers of each wrap varies, preferably increases substantially continuously, more preferably increases substantially linearly, along the length of the shaft.

In preferred embodiments of the present invention, in steps b) and d) the respective helical wrap has a width, orthogonal to a helical direction, of from 10 to 140 mm. Preferably the width is from 15 to 50 mm, further preferably from 25 to 35 mm, still further preferably about 30 mm.

In preferred embodiments of the present invention, in steps b) and d) the width of the respective helical wrap, orthogonal to the helical direction, varies. Preferably, the width increases substantially continuously, further preferably increases substantially linearly, along the length of the shaft.

In preferred embodiments of the present invention, step e) is carried out so that the elongate tubular shaft formed in step e) has an external elongate substantially conical surface and an internal elongate substantially conical surface. Preferably, each substantially conical surface comprises a series of adjoining conics.

In preferred embodiments of the present invention, the external elongate substantially conical surface and the internal elongate substantially conical surface are inclined at different respective inclination angles relative to the longitudinal direction. Preferably, the inclination angle of the external elongate substantially conical surface is smaller than the inclination angle of the internal elongate substantially conical surface, each inclination angle being relative to the longitudinal direction, whereby the wall thickness of the elongate tubular shaft decreases in combination with an increase in a diameter of the external elongate conical surface along a length of the elongate tubular shaft.

In preferred embodiments of the present invention, the wall thickness of the elongate tubular shaft decreases substantially continuously, preferably substantially linearly, with the increase in diameter of the external elongate conical surface along the length of the elongate tubular shaft.

In preferred embodiments of the present invention, in steps b) and d) the helical wrapping is along a helical direction which is at an angle of from 5 to 45 degrees, preferably from 10 to 35 degrees, further preferably from 15 to 25 degrees, yet further preferably at about 20 degrees, to a plane perpendicular to the longitudinal direction. Preferably, the angle of the helical direction is constant along the length of the tubular shaft.

In preferred embodiments of the present invention, in steps b) and d) at least two of the fibrous layers are helically wrapped about opposite rotational helical directions, preferably at equal and opposite helical wrapping angles.

In preferred embodiments of the present invention, in steps b) and d) alternating fibrous layers are helically wrapped about opposite rotational helical directions, preferably at equal and opposite helical wrapping angles.

In preferred embodiments of the present invention, in steps b) and d) the structural fibers are discontinuously aligned along the longitudinal direction along substantially the entire length of the elongate tubular shaft.

In preferred embodiments of the present invention, in steps b) and d) all of the fibers in the elongate tubular shaft which are aligned along the longitudinal direction are discontinuous fibers which each respectively extend along only a portion of the elongate tubular shaft.

In preferred embodiments of the present invention, in steps b) and d) the structural fibers which are aligned along the longitudinal direction have a length, along the longitudinal direction, of from 20 to 100 mm.

In preferred embodiments of the present invention, in steps b) and d) all of the structural fibers in the elongate tubular shaft are discontinuous fibers which each respectively extend along only a portion of the elongate tubular shaft.

In preferred embodiments of the present invention, in steps b) and d) at least two of the fibrous layers, preferably all of the fibrous layers, each respectively further comprise a plurality of helical structural fibers which are helically wound around the longitudinal direction, the helical structural fibers having a length in the longitudinal direction of less than the length of the elongate tubular shaft to form discontinuous helical structural fibers serially oriented along the elongate tubular shaft.

In preferred embodiments of the present invention, in steps b) and d) at least two of the fibrous layers, preferably all of the fibrous layers, comprising respective prepregs each respectively comprise first and second adjacent plies, the first ply comprising the substantially longitudinally oriented structural fibers of the respective fibrous layer and the second ply comprising the helical structural fibers of the respective fibrous layer.

In preferred embodiments of the present invention, in steps b) and d) at least two of the fibrous layers, preferably all of the fibrous layers, each respectively comprise a helically wrapped prepreg tape comprising the first and second adjacent plies.

In preferred embodiments of the present invention, in steps b) and d) the helical structural fibers are helically wound around the longitudinal direction at an angle of +/−45 degrees to the longitudinal direction.

In preferred embodiments of the present invention, steps b) and d) are carried out so that the multilaminar elongate tubular wall comprises from 40 to 80 wt % of the substantially longitudinally oriented structural fibers and from 20 to 60 wt % of the helical structural fibers, each wt % being based on the total weight of the structural fibers. Preferably, the helical structural fibers are helically wound around the longitudinal direction at an angle of +/−45 degrees to the longitudinal direction, In preferred embodiments of the present invention, steps b) and d) are carried out so that the multilaminar elongate tubular wall has a length of from 300 to 1500 mm.

In preferred embodiments of the present invention, steps b) and d) each respective fibrous layer is helically wrapped with from 5 to 50 rotations about the wrapping direction.

In preferred embodiments of the present invention, in steps b) and d) the oriented structural fibers are substantially aligned along the longitudinal direction so as to be oriented within +/−5°, preferably +/−2°, of the longitudinal direction.

The preferred embodiments of the present invention can provide an elongate tubular shaft for use in a sports article which can have highly concentric plies of carbon to provide a symmetric shaft with no spine. The shaft can exhibit highly homogeneous flexural and torque behavior as a result of a very high degree of fiber alignment and uniformity of thickness around the shaft. Carbon fibers are longitudinally aligned along the shaft to provide flexural stiffness, but since the longitudinally aligned carbon fibers are discontinuous, i.e. extend only along a portion of the shaft as a result of helical wrapping of fibrous layers to form the hollow tubular shaft, there is a very high uniformity of flexural stiffness around the shaft and also the flexural stiffness can be accurately and predictably varied along the length of the shaft without reducing rotational homogeneity around the shaft. The wrap angle can be controlled to provide a perfect elongated conical shape for the shaft, with a highly uniform wall thickness around the shaft. This can provide a highly uniform longitudinal flexural stiffness when tested at different angles of rotation around the longitudinal axis of the shaft, for example having a variation of less than +/−0.5% at any angle measured within the range of 360 degrees around the shaft. The wrap overlap can be readily controlled to vary the stiffness along the shaft. The discontinuous longitudinal fiber structure can also provide with control of the wrap angle and/or overlap a very smooth wall thickness transition from relatively thick to relatively thin laminate at opposite ends of the shaft. Such smooth thickness variations are particularly desired in golf club shafts to provide uniformly predictable mechanical properties along and around the shaft. The longitudinal and helical structural fibers provide a biaxial fiber construction along the shaft to control the torsional stiffness of the shaft.

The method to manufacture the elongate tubular shaft in the sports article of the present invention permits to apply multiple layers of prepreg material at the same time such that the proportion of unidirectional fibers which are orientated in the performing direction are greater than the proportion of unidirectional fibers which are obliquely orientated relative to said performing direction. Furthermore, the method of the present invention permits to control the presence of overlaps, non-overlaps or gaps between the adjacent turns of the winding, thus improving the quality of the tube. This method also permits a reduction of the manufacturing costs.

This method further enables production of tubes in a continuous way with different mandrels arranged to follow each other in a sequence which lead to an improvement of the production rate.

Winding a preform with this method controls tension in the preform in order to obtain a better homogeneity and facilitate the improved quality of thick tubes.

Finally, this method confers consistency to tube properties because it allows more control of the orientation of the fibers in the case of tapered and/or arbitrarily shaped section tubes with the adjustment of the shape of the preform and/or the applied angle of the preform after two applications of preforms on the tube.

BRIEF DESCRIPTION OF THE DRAWINGS

Other features and advantages of the present invention will appear more clearly from the detailed description of several embodiments of the invention which are illustrated by the attached drawings in which:

FIGS. 6a, 6b, 7a, 7b, 8a, 8b and 9a, 9b illustrate several specific examples tubes that can be formed to produce the sports article of an embodiment of the present invention;

DETAILED DESCRIPTION OF EMBODIMENTS OF THE INVENTION

Figure 1:
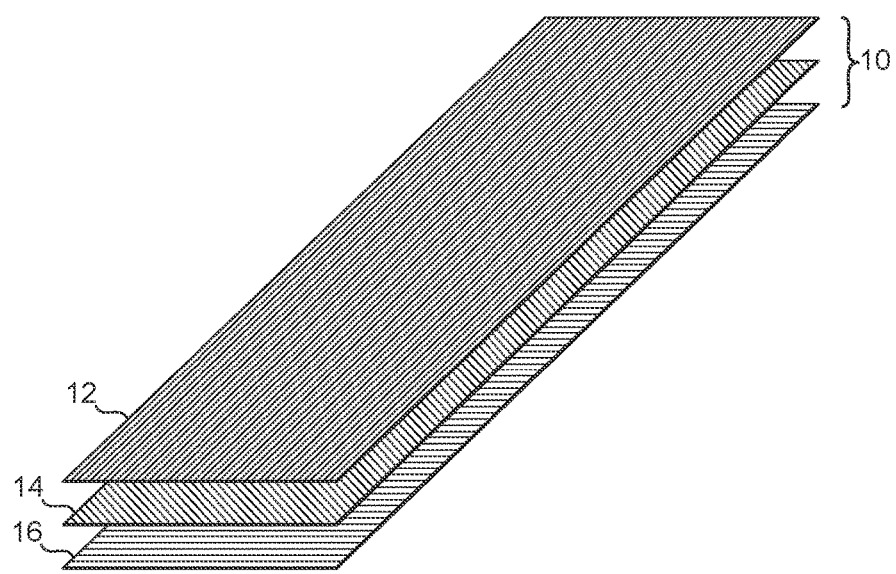
FIG. 1 is a diagrammatic representation of a preform that is suitable for use to produce the sports article of an embodiment of the present invention.

FIG. 1 illustrates an exemplary three-ply preform 10 suitable for use in a method to produce the sports article of an embodiment of the present invention. This preform 10 comprises a first ply 12, a second ply 14 and a third ply 16, said first, second and third plies each including a thermoset and/or thermoplastic resin matrix and fibers. In the embodiment shown, the fibers in the first ply 12 are oriented in the 0° direction. The fibers in the second ply 14 are oriented in the 45° direction. The fibers in the third ply 16 are oriented in the 90° direction. Furthermore, each ply has its own ply thickness and mechanical properties. In the example, the ply thickness of the first and third plies is lower than the ply thickness of the second ply.

While the illustrated embodiment of the preform FIG. 1 is a three-ply preform, and the subsequent FIGS. 1 to 10 describe the use of that three-ply preform to form an elongate tube, other embodiments of the present invention employ a two-ply preform, which is used to form a tubular shaft as described below. The preferred embodiment of a preform for manufacture of a sports article such as a golf club shaft is a two-ply preform, with the shaft comprising a laminate of two two-ply preforms to form a four-ply multilaminar structure. In the two-ply preform, as described below with reference to the perform tape, in the form of a prepreg tape, of FIG. 14, a first ply 206 comprises parallel oriented fibers 104 which are oriented in a first direction and, after helical wrapping as described below, are oriented substantially longitudinally along the shaft and an adjacent second ply 208 comprises parallel oriented fibers 204 which are oriented in a second direction and, after helical wrapping as described below, are oriented helically around the shaft.

Figure 2A:
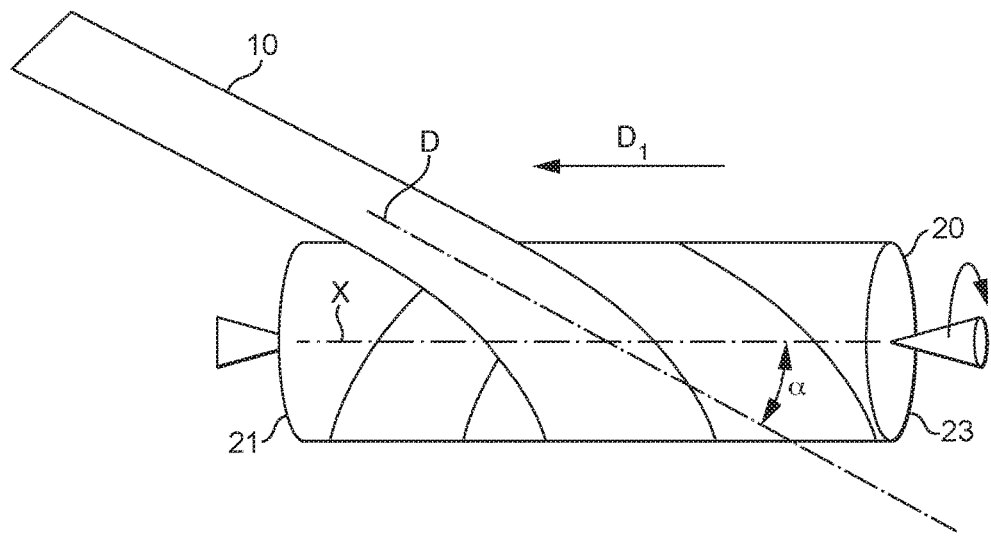
FIGS. 2a and 2b are schematic views illustrating an apparatus that is suitable for use to produce the sports article of an embodiment of the present invention.
Figure 2B:
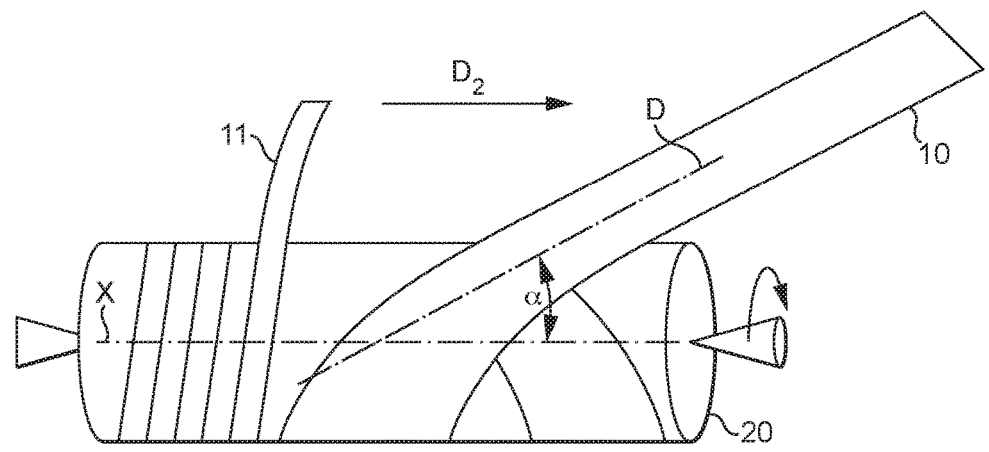

FIGS. 2a and 2b illustrate an example of the successive winding steps of the method according to one embodiment of the present invention. The preform 10 is firstly wound around a tubular mandrel 20 so that the third ply 16 is oriented towards said mandrel 20, the direction D of the first ply 12 defining an angle α with respect to the axis of the mandrel X, which is substantially equal to −45° in the example. Thus configured, the unidirectional fibers of the second layer 14 are substantially aligned with said axial direction X. The mandrel 20 may advantageously rotate around its own axis X. The preform 10 may advantageously be wound helically around the mandrel 20. Each turn of the preform around the mandrel 20 may overlap and/or be partially covered by another turn of the same, or may adjoin with its adjacent turns, or may be separated by a gap from its adjacent turns. The preform 10 is moved in the direction D1 until it reaches approximately a left end 21 of the mandrel 20. Thereafter, the preform 10 is reversed or changed in order to have the ply 12 orientated at 45°. The preform 10 moves laterally in the opposite direction so as to permit the helical winding of the preform 10 around the mandrel 20 from its left end 21 to its right end 23. During this winding operation, the first ply 12 is applied to the mandrel 20 and the direction D of said first ply defines an angle α with respect to the axis X of the mandrel, such that the orientation of the fibers in one ply of the preform 10 permits to improve a specific performance of the tube. In the embodiment shown, the angle α is substantially equal to +45°. Thus configured, the fibers of the second layer 14 are substantially aligned with said axial direction X, thus improving the performance of the tube when submitted to longitudinal loading. Simultaneously or afterwards, a strip of plastic imparting compacting pressure 11 is applied. Then, the structure formed by the preform 10 is consolidated with the reticulation of the resin matrix.

The method to produce the sports article of an embodiment of the present invention is not limited to the above detailed embodiment. In particular, in further embodiments (not shown) of the present invention, the mandrel may be conical and/or define at least partially a portion of a torus and/or have a non-round section. Furthermore, the preform may have an alternative design. In particular, a trapezoidal or tapered preform may advantageously be used when the mandrel is conical when it is wanted to avoid an increasing overlap of the turns as the preform moves towards the end of the mandrel having the smallest diameter, which leads to an increasing wall thickness of the composite structure, or when it is wanted a tube having varying angles along its length. The number of preforms wound around the mandrel may also be greater than one. Furthermore, the number of plies of said preform may be three or more and the orientation of the fibers of said plies relative to the main direction of the preform may be any angle suitable for improving the performance of the composite structure. In any case, the parameters of the method of the present invention should be chosen so as to form a fiber-reinforced composite structure, in which the proportion of unidirectional fibers having a direction beneficial for the main performance of the composite structure is greater than the proportion of unidirectional fibers obliquely orientated relative to said direction.

Figure 3A:
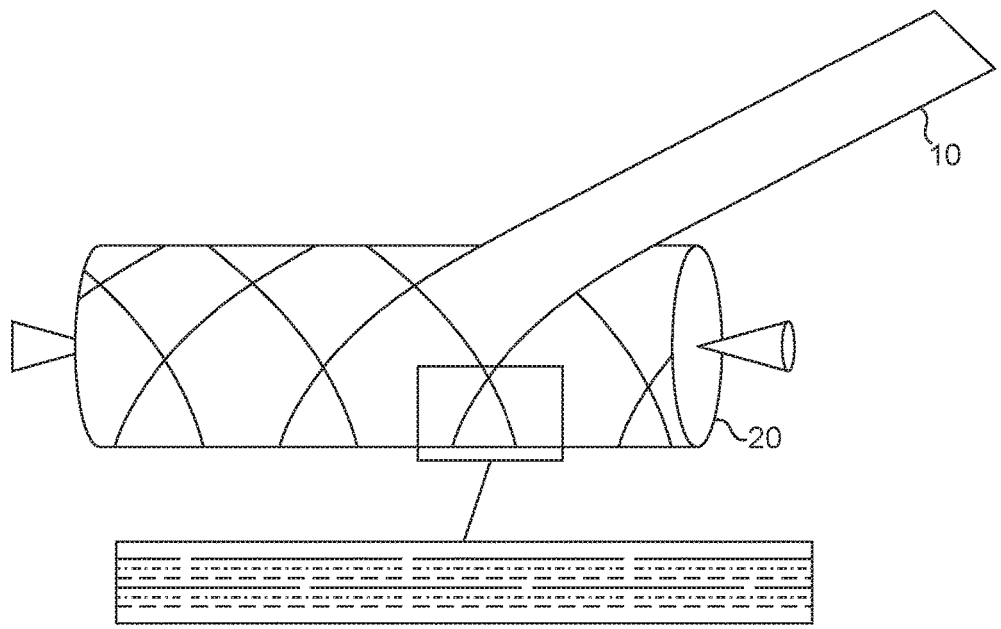
FIG. 3a is a view similar to FIG. 2b illustrating the butt joined preforms arrangement of a tube to produce the sports article of an embodiment of the present invention.

As illustrated in FIG. 3a, the preform 10 may advantageously be wound around the mandrel 20 in such a manner that each turn of the preform 10 around the mandrel 20 adjoins with another adjacent turn of the same.

Figure 3B:
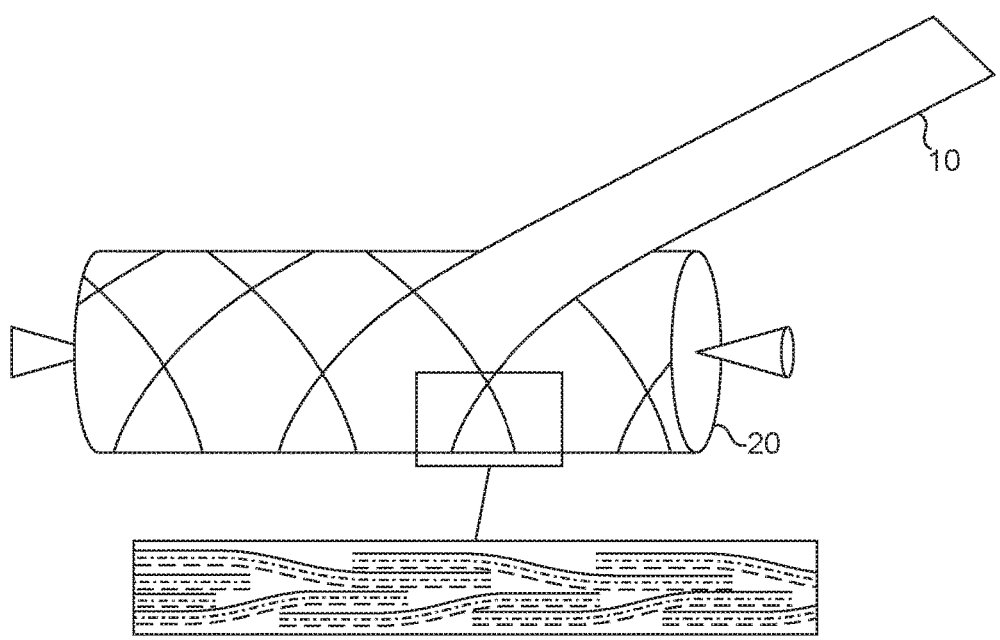
FIG. 3b is a view similar to FIG. 3a illustrating the overlapped preforms arrangement of a tube to produce the sports article of an embodiment of the present invention.
Figure 3C:
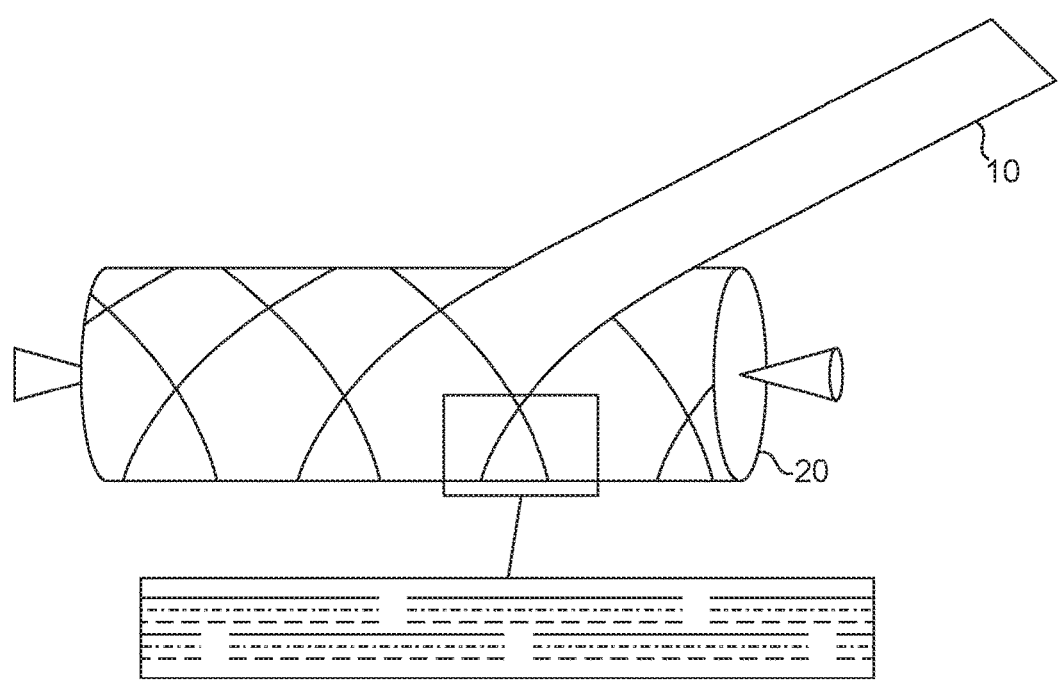
FIG. 3c is a view similar to FIG. 3a illustrating the spaced preforms arrangement of a tube to produce the sports article of an embodiment of the present invention.

Alternatively, as illustrated in FIG. 3b, the preform 10 may also be wound around the mandrel 20 in such a manner that each turn of the preform 10 around the mandrel 20 at least partially covers and/or is at least partially covered by another turn of the same. The preform 10 may also be wound around the mandrel 20 in such a manner that each turn of the preform 10 around the mandrel 20 is spaced from the other turn of the same, as illustrated in FIG. 3c.

Figure 4A:
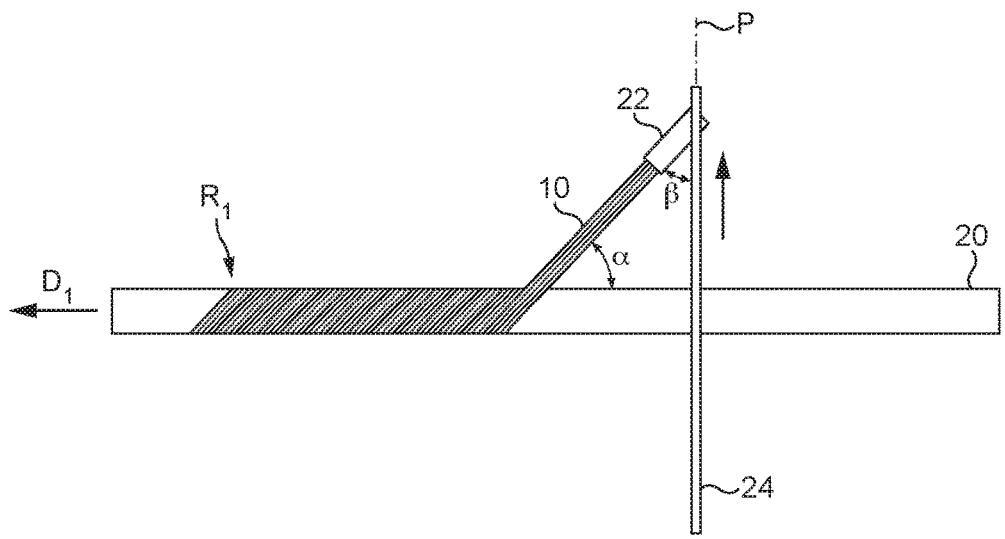
FIGS. 4a and 4b illustrate an alternative apparatus that is suitable for use to produce the sports article of an embodiment of the present invention.
Figure 4B:
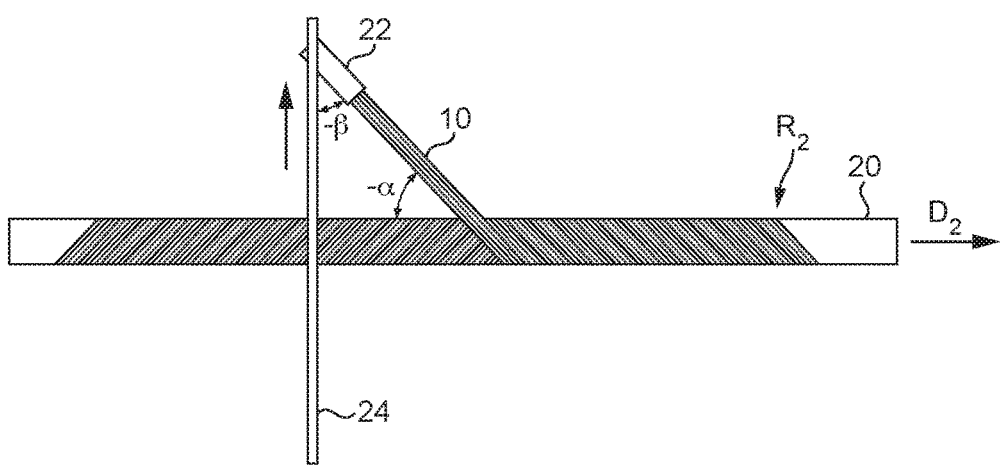

FIGS. 4a and 4b illustrate the forward and return helical winding of a preform 10 around a mandrel 20 by means of an alternative apparatus. Such an operation includes a first step consisting of displacing the mandrel 20 in the axial direction D1, without rotating it, and, simultaneously, clockwise rotating around said axial direction a roll 22, from which is delivered the preform 10. The roll 22 moves along a circular guide 24 that is centered on said mandrel axis, thus leading to the helical winding of the tape 10 from a left end region R1 of the mandrel 20 to a right end region R2 thereof. During this pass from left to right, the roll 22 is oriented at an angle β relative to the plane P defined by the circular guide 24 so that the helical winding is done at an angle α with respect to the direction D1. In a second step, corresponding to a pass from right to left, the orientation of the roll 22 relative to the circular guide 24 is modified so as to be at an angle −β relative to the plane P. Then, the mandrel 20 moves in the direction D2 opposite to D1 and, simultaneously, the clockwise rotation of the roll 22 is maintained. The return helical winding is thus done at an angle −α with respect to the axial direction.

Figure 5A:
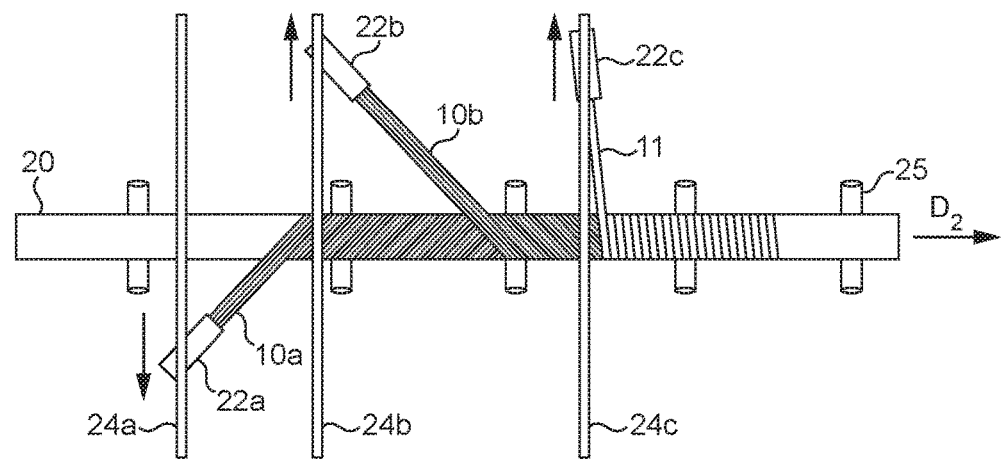
FIGS. 5a, 5b and 5c are schematic structural views illustrating another alternative apparatus that is suitable for use to produce the sports article of an embodiment of the present invention.
Figure 5B:
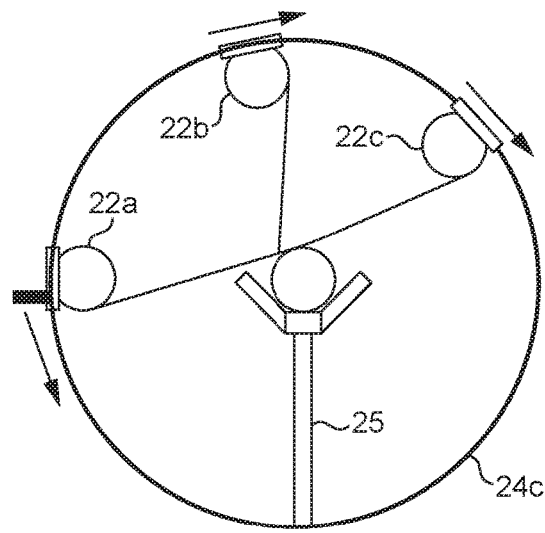
Figure 5C:
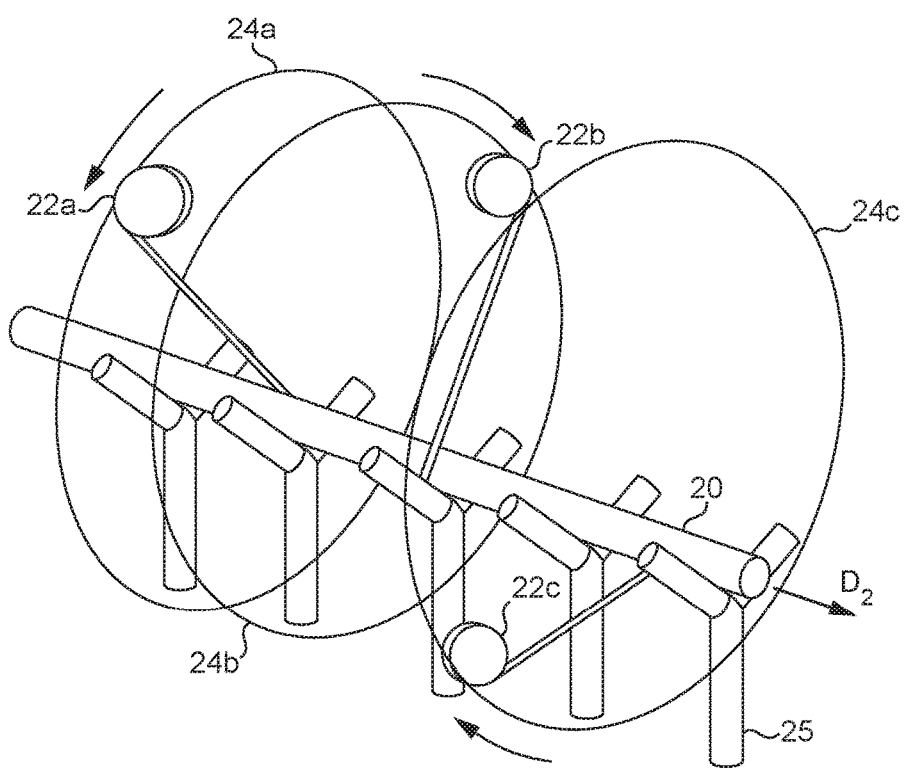

FIGS. 5a, 5b and 5c illustrate a further alternative apparatus permitting the winding operation of two preforms 10a, 10b and of a compacting tape 11 around a mandrel 20. In this example, the mandrel 20 is supported by several fork-shaped element 25 adapted to guide the mandrel during its displacement along an axial direction D2. The apparatus comprises respectively a roll 22a around which is wound the preform 10a, a roll 22b around which is wound the preform 10b and a roll 22c around which is wound the compacting tape 11, said roll 22a moving in a counterclockwise direction along a circular guide 24a, said roll 22b moving in a clockwise direction along a circular guide 24b and said roll 22c moving in a clockwise or counterclockwise direction along a circular guide 24c. Each circular guide is fixed in a position perpendicular to the axis of the mandrel. In this alternative, multiple mandrels are arranged in order to follow each other in a sequence. Mandrels are then wound continuously one after the other without a stop between the production of each part, thus increasing the production rate.

FIGS. 6a, 7a, 8a and 9a illustrate several examples of a composite tube that can be made to produce the sports article of an embodiment of the present invention. These examples should not be construed as limiting the scope of the invention in any way.

In the example shown in FIG. 6a, the mandrel 100 supports a plurality of windings of a preform 110 illustrated in FIG. 7b. This preform 110 comprises three plies, one first ply having fibers orientated at 0° relative to the longitudinal direction D defined by the preform 110, one second ply having fibers orientated at −45° relative to said longitudinal direction D and one third ply having fibers orientated at −90° relative to said longitudinal direction D. The preform 110 is wound on the mandrel 100 such that its longitudinal direction D is orientated at 45° relative to an axial direction X defined by the mandrel 100. Therefore, the fibers of the second ply are parallel to the axial direction X and the fibers of the first and third plies are orientated respectively at 45° and −45° relative to said axial direction X. Thus configured, the tube formed by the windings of the preform 110 has improved performance when submitted to bending and torsion loadings. The ratio between the bending performance and the torsion performance depends on the thickness and properties of each ply.

In the example shown in FIG. 7a, the mandrel 200 supports a plurality of windings of a preform 210 illustrated in FIG. 7b. This preform 210 comprises two plies, one first ply having fibers orientated at 45° relative to the longitudinal direction D defined by the preform 210 and one second ply having fibers orientated at −45° relative to said longitudinal direction D. The preform 210 is wound on the mandrel 200 such that its longitudinal direction D is orientated at 45° relative to an axial direction X defined by the mandrel 200. Therefore, the fibers of the second ply are parallel to the axial direction X and the fibers of the first ply are orientated at 90° relative to said axial direction X. Thus configured, the tube formed by the windings of the preform 210 has improved performance when submitted to bending or radial compression loadings.

Figure 8A:
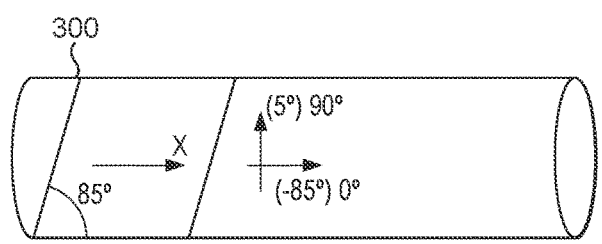
Figure 8B:
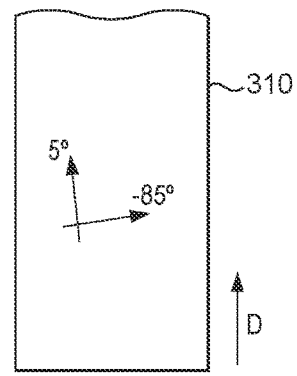

In the example shown in FIG. 8a, the mandrel 300 supports a plurality of windings of a preform 310 illustrated in FIG. 8b. This preform 10 comprises two plies, one first ply having fibers orientated at 5° relative to the longitudinal direction D defined by the preform 310 and one second ply having fibers orientated at −85° relative to said longitudinal direction D. The preform 310 is wound on the mandrel 300 such that its longitudinal direction D is orientated at 85° relative to an axial direction X defined by the mandrel 300. Therefore, the fibers of the second ply are parallel to the axial direction X and the fibers of the first ply are orientated at 90° relative to said axial direction X Thus configured, the tube formed by the windings of the preform 310 has improved performance when submitted to internal pressure loadings.

Figure 9A:
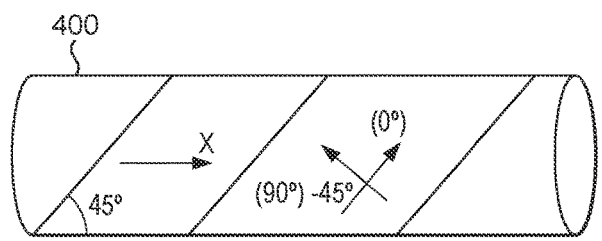
Figure 9B:
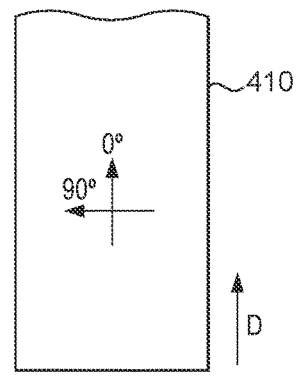

In the example shown in FIG. 9a, the mandrel 400 supports a plurality of windings of a preform 410 illustrated in FIG. 9b. This preform 410 comprises two plies, one first ply having fibers orientated at 0° relative to the longitudinal direction D defined by the preform 10 and one second ply having fibers orientated at 90° relative to said longitudinal direction D. The preform 410 is wound on the mandrel 400 such that its longitudinal direction D is orientated at 45° relative to an axial direction X defined by the mandrel 400. Therefore, the fibers of the first and second plies are orientated respectively at 45° and −45° relative to said axial direction X. Thus configured, the tube formed by the windings of the preform 410 has improved performance when submitted to torsion loadings.

FIGS. 10a, 10b, 10c and 10d illustrate several successive steps of a method to produce the sports article of an embodiment of the present invention when a composite tube having a toroidal shape has to be made.

Figure 10A:
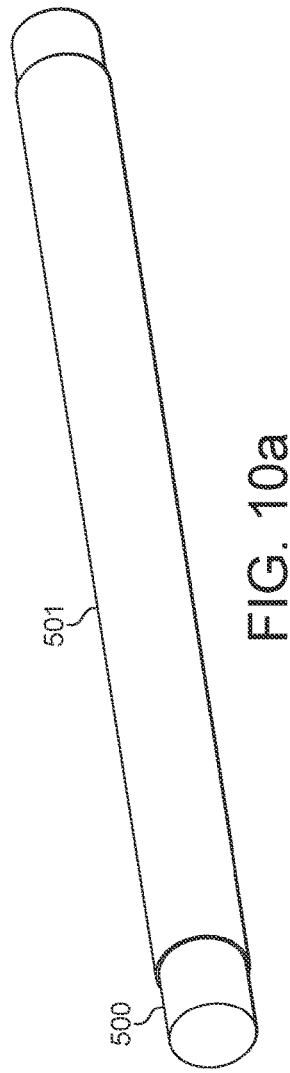
FIGS. 10a, 10b, 10c and 10d illustrate several successive steps of a method to produce the sports article of an embodiment of the present invention.

The first step, shown in FIG. 10a, consists of partially covering the periphery of a mandrel 500 with a plastic or silicone bladder 501.

Figure 10B:
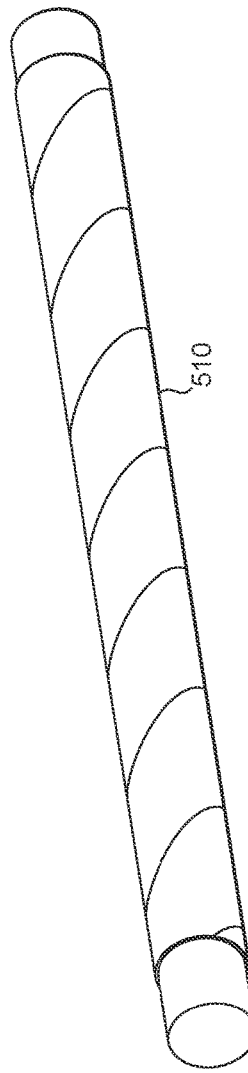

The second step, shown in FIG. 10b, consists of helically winding a preform 510 around said covered mandrel as described above.

Figure 10C:
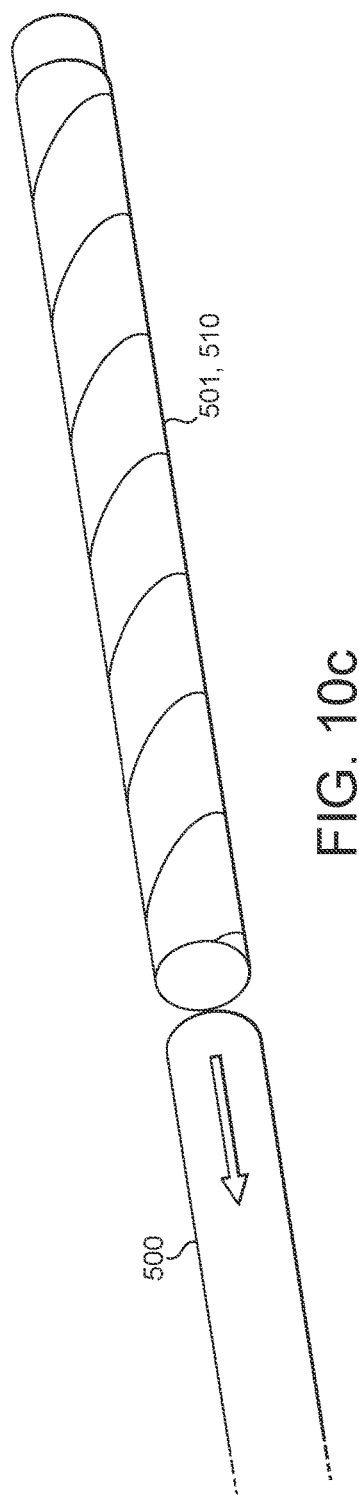

The third step, shown in FIG. 10c, consists of separation of the set formed by the preform 510 wound around the bladder 501 from the mandrel 500.

Figure 10D:
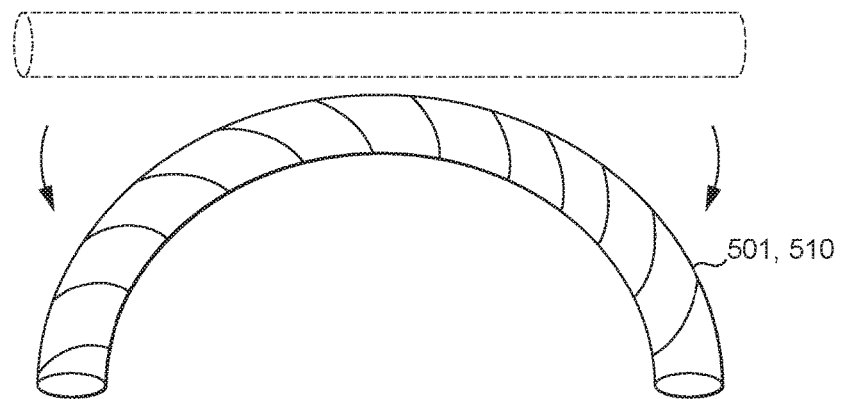

The fourth step, shown in FIG. 10d, consists of curving said bladder-preform set in order to shape it and, thereafter, position said set in a closed mold, before its consolidation. During the consolidation, pressure is applied inside the bladder so as to press the preform against the internal walls of the mold.

Due to the helical winding of the preform around the bladder, stresses and/or folds of the preform during the curving of the preform are avoided since the various parts of the preform slide on each other.

The composite tube manufactured according to any of the preceding embodiments may, ijn some embodiments, comprise a sports article comprising an elongate tubular shaft comprised of a fiber-reinforced resin matrix composite material, which preferably comprises carbon fibers. In particular, the sports article may be a shaft for a golf club.

A particular embodiment of such a shaft for a golf club is described below with reference to FIGS. 11 to 15.

Figure 11:
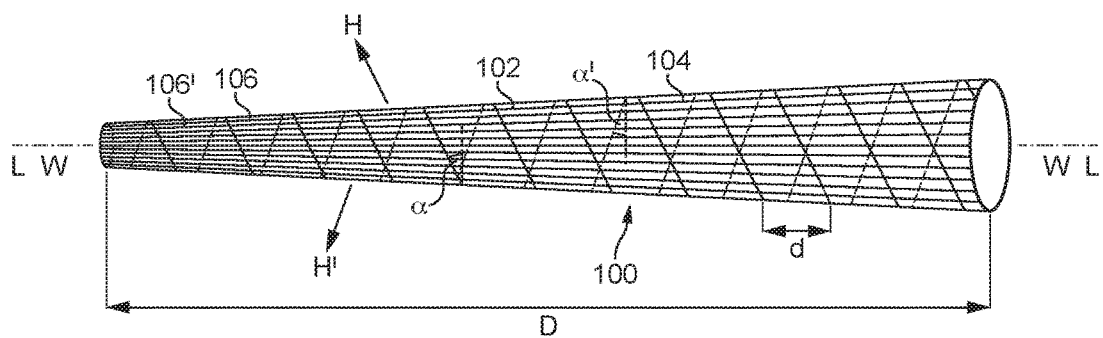
FIG. 11 illustrates a side view of a composite tube manufactured according to an embodiment of the present invention which comprises an elongate tubular shaft of a sports article such as a golf club shaft.
Figure 12:
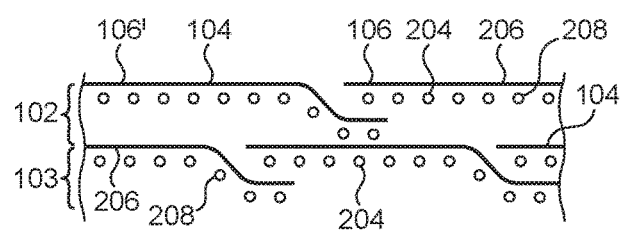
FIG. 12 is an enlarged cross-section through a wall portion of the elongate tubular shaft of FIG. 11.
Figure 13:
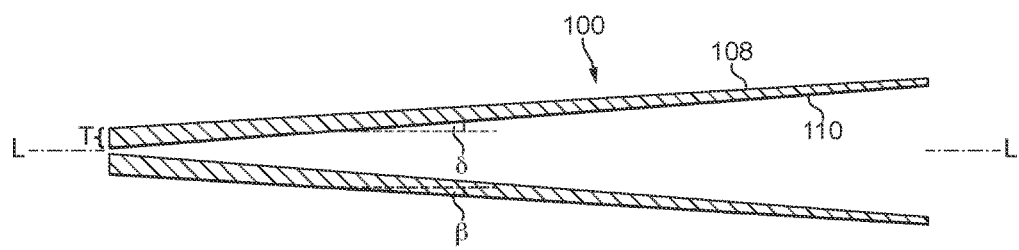
FIG. 13 is a further cross-section through the elongate tubular shaft of FIG. 11.

Referring to FIGS. 11 to 13, which for the purpose of clarity of illustration are not to scale, width and thickness being exaggerated, the elongate tubular shaft 100 has a longitudinal direction L and the shaft includes at least two fibrous layers 102, 103, each of which is helically wrapped about a wrapping direction W extending along the longitudinal direction L to form the elongate tubular shaft 100 which is multilaminar. In FIG. 11 the outer fibrous layer 102 is shown in bold and the inner fibrous layer 103, adjacent to and covered by the outer fibrous layer 102, is shown in phantom by dashed lines. Each fibrous layer comprises a prepreg, in particular fibres, for example carbon fibres, impregnated with a resin, such as a thermosetting resin, for example epoxy resin. The fibre dimensions and fibre packing within the prepreg may be any suitable values, as are well known to those skilled in the art. Such carbon fibre/epoxy resin prepregs are known in the art and available in commerce form a variety of different prepreg manufacturers.

Each fibrous layer 102, 103 comprises a plurality of oriented structural fibers 104 which are substantially aligned along the longitudinal direction so as to be oriented within +/−10° of the longitudinal direction L. Typically, the oriented structural fibers 104 are substantially aligned along the longitudinal direction L so as to be oriented within +/−5°, optionally +/−2°, of the longitudinal direction L.

The shaft 100 comprises a plurality of the fibrous layers 102, 103 which are helically wrapped about the wrapping direction W to form the multilaminar elongate tubular shaft 100. In this embodiment, at least two of the fibrous layers 102, 103 are helically wrapped about opposite rotational helical directions H and H', optionally at equal and opposite helical wrapping angles α and α'. Typically, alternating fibrous layers 102, 103 are helically wrapped about opposite rotational helical directions H and H', optionally at equal and opposite helical wrapping angles α and α'.

The helical wrapping is along a helical direction H, H' which is at an angle of from 5 to 45 degrees, optionally from 10 to 35 degrees, further optionally from 15 to 25 degrees, yet further optionally at about 20 degrees, to a plane perpendicular to the longitudinal direction L. Typically, the angle of the helical direction H, H' is constant along the length of the elongate tubular shaft 100.

The or each fibrous layer 102, 103 comprises a plurality of oriented structural fibers 104 which are substantially aligned along the longitudinal direction L. The oriented structural fibers 104 have a length d, along the longitudinal direction, of less than the length D of the elongate tubular shaft 100 thereby to form discontinuous structural fibers 104 serially oriented along the elongate tubular shaft 100. Typically, the elongate tubular shaft 100 has a length D of from 300 to 1500 mm.

In the preferred embodiments, the structural fibers 104 are discontinuously aligned along the longitudinal direction L along substantially the entire length D of the elongate tubular shaft 100. Preferably, all of the fibers 104 in the elongate tubular shaft 100 which are aligned along the longitudinal direction L are discontinuous fibers 104 which each respectively extend along only a portion of the elongate tubular shaft 100. Typically, the structural fibers 104 have a length d, along the longitudinal direction L, of from 20 to 100 mm. 22. The structural fibers 104 are discontinuously aligned along the longitudinal direction L along substantially the entire length D of the elongate tubular shaft 100.

In the preferred embodiments, all of the structural fibers in the elongate tubular shaft 100 are discontinuous fibers which each respectively extend along only a portion of the elongate tubular shaft 100.

At least two of the fibrous layers 102, 103, optionally all of the fibrous layers, each respectively further comprise a plurality of helical structural fibers 204, shown in FIG. 12, which are helically wound around the longitudinal direction L. The helical structural fibers 204 have a length in the longitudinal direction L of less than the length of the elongate tubular shaft 100 to form discontinuous helical structural fibers 204 serially oriented along the elongate tubular shaft 100.

Figure 14:
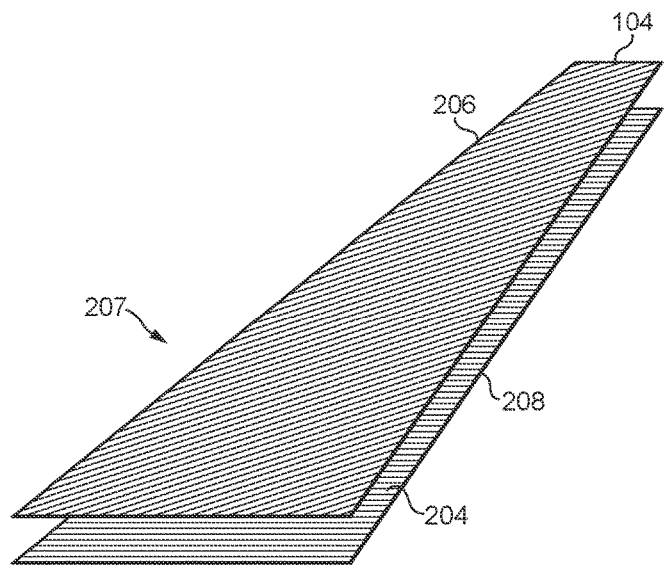
FIG. 14 is an exploded perspective view of a preform tape to form a fibrous layer in the elongate tubular shaft of FIG. 11.

Typically, as shown in particular in FIGS. 12 and 14, the fibrous layers 102, 103 each respectively comprise first and second adjacent plies 206, 208, the first ply 206 comprising the substantially longitudinally oriented structural fibers 104 of the respective fibrous layer 102, 103 and the second ply 208 comprising the helical structural fibers 204 of the respective fibrous layer 102, 103. These first and second adjacent plies 206, 208 are in a preform tape 207 as shown in FIG. 14.

The fibrous layers 102, 103 typically each respectively comprise a helically wrapped multi-ply tape 207 as shown in planar form in FIG. 14, comprising the first and second adjacent plies 206, 208.

In other embodiments, there are more than two fibrous layers and each fibrous layer respectively comprises a helically wrapped tape comprising the first and second adjacent plies 206, 208. Most typically, the helical structural fibers 204 are helically wound around the longitudinal direction L at an angle of 45 degrees to the longitudinal direction L.

Preferably, the shaft 100 comprises from 40 to 80 wt % of the substantially longitudinally oriented structural fibers 104 and from 20 to 60 wt % of the helical structural fibers 204, most preferably helical structural fibers 204 which are helically wound around the longitudinal direction L at an angle of +/−45 degrees to the longitudinal direction L, each wt % being based on the total weight of the structural fibers 104, 204.

In the preferred embodiment, the elongate tubular shaft 100 comprises an even number of first and second plies 206, 208 from a plurality of fibrous layers 102, 103 sequentially helically wrapped in opposite rotational directions. For example, the elongate tubular shaft 100 comprises two fibrous layers 102, 103 which have been helically wrapped in opposite rotational directions. This typically provides a multi-ply structure having the following ply orientations relative to the longitudinal direction: 0°, +45°, 0°, −45°, although as described above alternative helical wrapping angles may be employed.

Typically, the at least one fibrous layer 102, 103 is helically wrapped with from 5 to 50 rotations about the wrapping direction W to form the elongate tubular shaft 100.

The fibrous layer 102, 103 is helically wrapped about the wrapping direction W so that, as show in FIG. 12, the structural fibers 104 of each helical wrap 106 in the respective fibrous layer 102, 103 at least partially overlap with the structural fibers 104 of a longitudinally adjacent helical wrap 106'. Typically, the structural fibers 104 of each wrap 106 at least partially overlap with from 5 to 90% of the length d of the structural fibers of the longitudinally adjacent wrap 106'.

A degree of overlap between the structural fibers 104 of each wrap 106 may vary along the length of the shaft. Typically, the degree of overlap between the structural fibers 104 of each wrap 106 increases substantially continuously along the length D of the shaft 100. The degree of overlap between the structural fibers 104 of each wrap 106 may increase substantially linearly along the length D of the shaft 100. When the shaft 100 is substantially conical, as described further below, the degree of overlap decreases with increasing diameter of the substantially conical shaft 100.

Typically, the helical wrap 106 has a width, orthogonal to the helical direction H, of from 10 to 140 mm, optionally from 15 to 50 mm, further optionally from 25 to 35 mm, still further optionally about 30 mm. This width is provided by employing a corresponding tape width during the manufacturing process as described hereinbefore in which tape is helically wound about a mandrel to form the fibrous layer. The width of the helical wrap 106, orthogonal to the helical direction H, may vary along the length D of the shaft 100.

As shown in FIG. 14, which shows a tape 207 prior to winding to form the helical wrap 106, typically, the width of the helical wrap 106, orthogonal to the helical direction H, increases substantially continuously, and optionally substantially linearly, along the length D of the shaft 100. This is achieved by varying the width of the tape 207. When the shaft 100 is conical, as described further below, the width of the tape 207, and consequently of the helical wrap 106, increases with increasing diameter of the conical shaft 100.

As shown schematically in FIG. 13, in which the width dimensions of the shaft 100 are exaggerated for the purpose of clarity of illustration, the elongate tubular shaft 100 preferably has an external elongate substantially conical surface 108 and an internal elongate substantially conical surface 110, each substantially conical surface 108, 110 optionally comprising a series of adjoining conics as a result of the serial helical wraps 106. The external elongate substantially conical surface 108 and the internal elongate substantially conical surface 110 are inclined at different respective inclination angles β and δ relative to the longitudinal direction L. The inclination angle β of the external elongate conical surface 108 is smaller than the inclination angle δ of the internal elongate conical surface 110, each inclination angle β, δ being relative to the longitudinal direction L.

Accordingly, the wall thickness T of the elongate tubular shaft 100 decreases in combination with an increase in a diameter of the external elongate conical surface 108 along a length of the elongate tubular shaft 100. Typically, the wall thickness T of the elongate tubular shaft 100 decreases substantially continuously, and preferably substantially linearly, with the increase in diameter of the external elongate conical surface 108 along the length of the elongate tubular shaft 100.

As a result of the highly uniform wrapping configuration of the fibrous layer 102, 103 forming the shaft 100, the elongate tubular shaft 100 has a longitudinal flexural stiffness which is substantially uniform when measured in a measuring direction orthogonal to the longitudinal direction L at any angle of rotation relative to an axis coincident with the longitudinal direction L. Typically, the longitudinal flexural stiffness varies by less than +/−0.5% when measured in a measuring direction orthogonal to the longitudinal direction L at any angle of rotation relative to an axis coincident with the longitudinal direction L.

The elongate tubular shaft 100 typically has a weight of from 45 to 65 g. The elongate tubular shaft 100 also typically has a flexibility defined by a frequency of from 230 to 300 cycles per minute when the shaft 100 is flexed and then released in a flexing direction orthogonal to the longitudinal direction L at any angle of rotation about an angle of 360 degrees relative to an axis coincident with the longitudinal direction L. Preferably, the flexibility varies by no more than 5 cycles per minute at any angle of rotation about the angle of 360 degrees relative to the axis coincident with the longitudinal direction L. Typically, the shaft 100 has a torque of from 2 to 5 degrees, the torque being measured by applying 1 foot pound of torque to the shaft at a first end of the shaft (typically the thinner tip) while clamping a second end of the shaft (typically the thicker butt end).

Figure 15:
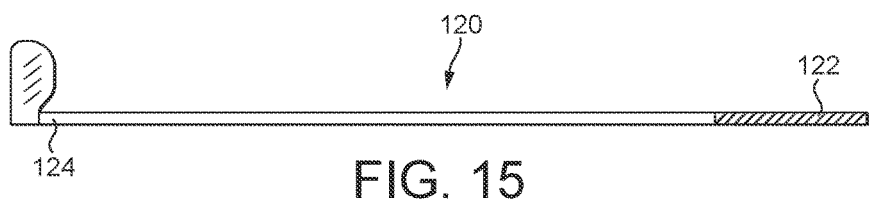
FIG. 15 is a golf club incorporating the elongate tubular shaft of FIG. 11.

As described above, in a particularly preferred aspect of the present invention the elongate tubular shaft 100 is a golf club shaft 120, as shown in FIG. 15. Typically, the golf club shaft 120 is conical and extends between a handle end 122 and a head end 124, with a diameter of the shaft 120 being greater at the handle end 122 than at the head end 124. Additionally or alternatively, a wall thickness of the shaft 120 is greater at the handle end 122 than at the head end 124.

What is claimed is:

1. A sports article comprising:
    a golf club shaft comprising an elongate tubular shaft comprised of a carbon fiber-reinforced resin matrix composite material, wherein the elongate tubular shaft has a length D in a longitudinal shaft direction L and the shaft is multilaminar and includes first and second wound preform tapes, each of which first and second preform tapes is helically wrapped around the longitudinal shaft direction L to form the elongate tubular shaft,
    wherein each first and second preform tape has, in an unwrapped state, a longitudinal tape axis and comprises a plurality of oriented fibrous layers, wherein at least one of the oriented fibrous layers in each of the first and second preform tapes comprises oriented structural carbon fibers disposed at a fiber angles of 45 or 85 degrees to the respective longitudinal tape axis,
    each preform tape being wrapped at a selected wrap angle α of from 5 to 45 degrees to a plane perpendicular to the longitudinal shaft direction L, wherein the first and second preform tapes are helically wrapped around the longitudinal shaft direction L about opposite rotational helical wrapping directions at the selected wrap angle in the range of +5 to +45 and −5 to −45 respectively to a plane perpendicular to the longitudinal shaft direction L, such that the oriented structural carbon fibers, disposed at the fiber angle of from 45 or 85 degrees to the respective longitudinal tape axis, of the wrapped first and second preform tapes are substantially aligned along the longitudinal shaft direction L so as to be oriented within +/−10° of the longitudinal shaft direction L,
    the oriented structural carbon fibers of the wrapped first and second preform tapes have a fiber length d, along the longitudinal shaft direction L, of from 20 to 100 mm thereby to form discontinuous structural carbon fibers serially oriented along the longitudinal shaft direction L of the elongate tubular shaft.

2. The sports article according to claim 1 wherein each preform tape is helically wrapped about the wrapping direction so that the structural fibers of each helical wrap at least partially overlap with the structural carbon fibers of a longitudinally adjacent helical wrap.

3. The sports article according to claim 2 wherein a degree of overlap between the structural carbon fibers of each wrapped preform tape varies along the length of the shaft.

4. The sports article according to claim 1 wherein the helical wrap has a width, orthogonal to a helical direction, of from 10 to 140 mm.

5. The sports article according to claim 1 wherein the fibrous layers are helically wound around the longitudinal shaft direction L at an angle of +/−45 degrees to the longitudinal shaft direction L.

6. The sports article according to claim 1 wherein the shaft is substantially conical and extends between a handle end and a head end, with a diameter of the shaft being greater at the handle end than at the head end.

7. The sports article according to claim 6 which has a weight of from 45 to 65 g, a flexibility defined by a frequency of from 230 to 300 cycles per minute when the shaft is flexed and then released in a flexing direction orthogonal to the longitudinal direction at any angle of rotation about an angle of 360 degrees relative to an axis coincident with the longitudinal direction.

8. The sports article according to claim 7 wherein the shaft has a torque of from 2 to 5 degrees, the torque being measured by applying 1 foot pound of torque to the shaft at a first end of the shaft while clamping a second end of the shaft.

9. A golf club comprising the elongate tubular shaft of claim 1, wherein the elongate tubular shaft is substantially conical and has an external elongate substantially conical surface and an internal elongate substantially conical surface, the shaft extending between a handle end and a head end, a diameter of the shaft being greater at the handle end than at the head end, wherein each of the preform tapes is helically wrapped so that the structural carbon fibers of each helical wrap at least partially overlap with from 5-90% of the length of the structural carbon fibers of a longitudinally adjacent helical wrap, and wherein the shaft has a weight of from 45 to 65 g, a flexibility defined by a frequency of from 230 to 300 cycles per minute when the shaft is flexed and then released in a flexing direction orthogonal to the longitudinal shaft L at any angle of rotation about an angle of 360 degrees relative to an axis coincident with the longitudinal shaft direction L and wherein the flexibility varies by no more than 5 cycles per minute at any angle of rotation about the angle of 360 degrees relative to the axis coincident with the longitudinal shaft direction L.

* * * * *

UNITED STATES PATENT AND TRADEMARK OFFICE
CERTIFICATE OF CORRECTION

PATENT NO. : 10,272,302 B2
APPLICATION NO. : 15/073907
DATED : April 30, 2019
INVENTOR(S) : Mordasini et al.

Page 1 of 1

It is certified that error appears in the above-identified patent and that said Letters Patent is hereby corrected as shown below:

In the Claims

Column 16, Line 37 (Claim 1, Line 16) amend "angles" to –angle–

Signed and Sealed this
Thirteenth Day of August, 2019

Andrei Iancu
*Director of the United States Patent and Trademark Office*